United States Patent
Beenen

(10) Patent No.: US 12,103,497 B2
(45) Date of Patent: Oct. 1, 2024

(54) SYSTEM FOR ATTACHING A STORAGE PANEL TO A VEHICLE SEAT

(71) Applicant: BuiltRight Industries LLC, Brookfield, CT (US)

(72) Inventor: Matthew Walker Beenen, Ridgefield, CT (US)

(73) Assignee: BuiltRight Industries, LLC, Brookfield, CT (US)

( * ) Notice: Subject to any disclaimer, the term of this patent is extended or adjusted under 35 U.S.C. 154(b) by 239 days.

(21) Appl. No.: 17/805,045

(22) Filed: Jun. 2, 2022

(65) Prior Publication Data

US 2022/0388451 A1    Dec. 8, 2022

Related U.S. Application Data

(60) Provisional application No. 63/195,978, filed on Jun. 2, 2021.

(51) Int. Cl.
*B60R 7/04* (2006.01)
*B60R 11/00* (2006.01)

(52) U.S. Cl.
CPC ....... *B60R 7/043* (2013.01); *B60R 2011/0015* (2013.01); *B60R 2011/0017* (2013.01); *B60R 2011/0059* (2013.01)

(58) Field of Classification Search
None
See application file for complete search history.

(56) References Cited

U.S. PATENT DOCUMENTS

| | | | |
|---|---|---|---|
| 4,660,237 A * | 4/1987 | Brodnax | A47C 20/043 5/636 |
| 10,308,301 B2 | 6/2019 | Walk | |
| 10,575,645 B1 * | 3/2020 | Colon | A47C 1/11 |
| 2009/0016807 A1 * | 1/2009 | Koch | A47C 4/028 403/26 |
| 2009/0127897 A1 * | 5/2009 | Watanabe | B60R 11/0235 297/217.3 |
| 2011/0272975 A1 * | 11/2011 | Hogg | F17C 13/084 224/567 |
| 2016/0167587 A1 * | 6/2016 | Dry | B60R 11/02 224/275 |
| 2016/0167593 A1 * | 6/2016 | Dry | B60R 11/02 297/188.04 |
| 2016/0172797 A1 * | 6/2016 | Dry | B60R 11/02 439/529 |
| 2016/0176357 A1 * | 6/2016 | Maslakow | F16M 13/00 29/428 |
| 2019/0308533 A1 * | 10/2019 | Ewel | B60N 2/6009 |
| 2021/0221295 A1 * | 7/2021 | Vanderpool | B60R 7/043 |
| 2022/0105876 A1 * | 4/2022 | Kim | B60R 11/0235 |
| 2022/0118893 A1 * | 4/2022 | Line | B60N 2/80 |
| 2023/0050582 A1 * | 2/2023 | Wang | B62D 21/02 |

* cited by examiner

*Primary Examiner* — David E Allred
(74) *Attorney, Agent, or Firm* — Sisson & Banyas, Attorneys at Law, LLC; Jeffrey J. Banyas

(57) ABSTRACT

A system for attaching a storage panel to a vehicle seat may include a storage panel with a defined plane, top surface, and bottom surface, with at least one mounting hole passing from the top surface to the bottom surface. Additionally, the system may also include at least one top bracket with a first lip to attach to a seat frame structure. The system may also include a bottom bracket with a section to attach to the seat frame structure.

18 Claims, 14 Drawing Sheets

SYSTEM FOR ATTACHING A STORAGE PANEL TO A VEHICLE SEAT

CROSS REFERENCES AND PRIORITIES

This application claims priority from U.S. Provisional Application No. 63/195,978 filed on 2 Jun. 2021 the teachings of which are incorporated by reference herein in their entirety.

BACKGROUND

Vehicles have limited storage and organization space. This is an issue for everyday drivers that is often addressed with multiple trips. However, multiple trips are often impractical. The lack of storage space is amplified when traveling for long distances or extended periods. Some drivers also desire additional storage options in cases of extended travel, off roading, or other ventures beyond just typical local road or highway use.

Often these issues are addressed by use of storage panels to which various objects can be organized and attached. These storage panels may be attached throughout the vehicle, including to the rear surface of a vehicle seat.

In the prior art, storage panels are typically attached to a vehicle seat by straps, ties, bungie cords, or hook-and-loop attachment mechanisms such as Velcro®. One such system is disclosed in U.S. Pat. No. 10,308,301 B2 which describes a seat for use with a vehicle is provided. The seat including a base, a cushioning material coupled to the base, an outer cover positioned over the base and the cushioning material. The outer cover including at least one accessory portion [i.e.—a storage panel] having at least one strap coupled to a seam of the outer cover and a securement component coupling the at least one strap to the outer cover.

However, such solutions suffer from flaws such as lack of solid attachment to the vehicle seat, lesser utilization of space, the need for attachment using the front and back of the seat causing discomfort for passengers or total non-use of the seat, and shifting of the panel during use leading to damage and wear of the seat upholstery as well as an increased possibility that items attached to the storage panel may come dislodged during an accident. The need exists therefore, for an improved system for attaching a storage panel to a vehicle seat.

SUMMARY

It is described herein a system for attaching a storage panel to a vehicle seat. The system comprises a storage panel, at least one top bracket, and at least one bottom bracket. The storage panel spans at least a distance between the at least one top bracket and the at least one bottom bracket.

The storage panel comprises a storage panel plane defining a storage panel top surface and a storage panel bottom surface opposite the storage panel top surface. At least one storage mounting hole passes from the storage panel top surface through the storage panel bottom surface.

The at least one top bracket comprises a first lip. The first lip comprises at least one top bracket through hole configured to attached to a first location of a seat frame structure.

The at least one bottom bracket comprises at least a first bottom bracket section and at least one bottom bracket through hole. The at least one bottom bracket through hole is configured to attach to a second location of the seat frame structure.

In some embodiments, the at least one top bracket may be integrally connected to the storage panel. In other embodiments, the at least one top bracket may be connected to the storage panel by a first fastener.

In certain embodiments, the at least one top bracket may comprise at least a first top bracket and a second top bracket. In such embodiments, the first top bracket may comprise a first top bracket lip. The first top bracket lip may comprise a first top bracket through hole configured to attach to the first location of the seat frame structure. Similarly, in such embodiments, the second top bracket may comprise a second top bracket lip. The second top bracket lip may comprise a second top bracket through hole configured to attach to a third location of the seat frame structure.

In some embodiments, the at least one top bracket through hole may have a hole shape selected from the group consisting of circular ovular, triangular, quadrilateral, hexagonal, or octagonal. In embodiments comprising at least a first top bracket and a second top bracket, the first top bracket through hole may have a hole shape selected from the group consisting of circular, ovular, triangular, quadrilateral, hexagonal, or octagonal. Similarly, the second top bracket through hole may have a hole shape selected from the group consisting of circular, ovular, triangular, quadrilateral, hexagonal, or octagonal.

In certain embodiments, the at least one bottom bracket may be integrally connected to the storage panel. In other embodiments, the at least one bottom bracket may be connected to the storage panel by a second fastener.

In some embodiments, the at least one bottom bracket may comprise at least a first bottom bracket and a second bottom bracket. In such embodiments, the first bottom bracket may comprise a first bottom bracket section. The first bottom bracket section may comprise a first bottom bracket through hole configured to attach to the second location of the seat frame structure. Similarly, in such embodiments, the second bottom bracket may comprise a second bottom bracket section. The second bottom bracket section may comprise a second bottom bracket through hole configured to attach to a fourth location of the seat frame structure.

In certain embodiments, the at least one bottom bracket through hole may have a hole shape selected from the group consisting of circular, ovular, triangular, quadrilateral, hexagonal, or octagonal. In embodiments comprising at least a first bottom bracket and a second bottom bracket, the first bottom bracket through hole may have a hole shape selected from the group consisting of circular, ovular, triangular, quadrilateral, hexagonal, or octagonal. Similarly, the second bottom bracket through hole may have a hole shape selected from the group consisting of circular, ovular, triangular, quadrilateral, hexagonal, or octagonal.

In some embodiments, the at least one storage mounting hole may comprise a plurality of storage mounting holes. In such embodiments, the plurality of storage mounting holes may be arranged in a MOLLE/PALS pattern. In certain embodiments, at least one of the plurality of storage mounting holes may be a threaded hole capable of receiving a threaded fastener.

In certain embodiments, the first location of the seat frame structure may be a first seat headrest post. In embodiments comprising at least a first top bracket and a second top bracket, the third location of the seat frame structure may be a second seat headrest post.

In some embodiments, the second location of the seat frame structure may be a second lower portion of a seatback frame structure. In embodiments comprising at least a first bottom bracket and a second bottom bracket, the fourth location of the seat frame structure may be a first lower portion of a seatback frame structure.

In certain embodiments, at least a portion of the bottom bracket may be configured to pass through an upholstery seam of the vehicle seat. In embodiments comprising at least a first bottom bracket and a second bottom bracket, at least a portion of the first bottom bracket may be configured to pass through an upholstery seam of the vehicle seat. Similarly, in such embodiments, at least a portion of the second bottom bracket may be configured to pass through an upholstery seam of the vehicle seat.

In some embodiments, the system may not contain a flexible attachment strap for connecting the storage panel to the vehicle seat.

In certain embodiments, the at least one top bracket may further comprise a secondary lip. The secondary lip, when present, may extend upwardly from the first lip. The secondary lip may comprise at least one secondary lip hole. In such embodiments, the at least one top bracket may further comprise a clamp section configured to attach to the secondary lip by a clamp fastener which may pass through the secondary lip through hole and into the clamp section. In such embodiments, the first location of the seat frame structure may be configured to attach to the clamp section at a clamp section aperture.

In some embodiments, the storage panel may comprise a first panel section and a second panel section. The first panel section may comprise a first channel connected to a first panel section first side edge and a second channel connected to a first panel section second side edge. The second panel section may have a second panel section first side edge and a second panel section second side edge. The second panel may be slideably engaged with the first panel section with the second panel section first side edge disposed within the first channel and the second panel section second side edge disposed within the second channel. In such embodiments, the at least one top bracket may be connected to one of a first panel section top edge or a second panel section top edge. Similarly, the at least one bottom bracket may be connected to one of a first panel section bottom edge or a second panel section bottom edge.

Further described herein is a system for attaching a storage panel to a vehicle seat comprising a storage panel and a mounting bracket. The storage panel comprises a storage panel plane defining a storage panel top surface and a storage panel bottom surface opposite the storage panel top surface. At least one storage mounting hole passes from the storage panel top surface through the storage panel bottom surface. The mounting bracket comprises a planar surface having a mounting bracket top surface and a mounting bracket bottom surface. A mounting bracket first lip extends from the mounting bracket bottom surface at a mounting bracket top edge. A mounting bracket second lip extends from the mounting bracket bottom surface at a mounting bracket bottom edge.

In such embodiments, the mounting bracket top surface may connect to at least a portion of the storage panel bottom surface. The mounting bracket first lip may be configured to attach to a first location of a seat frame structure. The mounting bracket second lip may be configured to attach to a second location of the seat frame structure.

DETAILED DESCRIPTION

Disclosed herein is a system for attaching a storage panel to a vehicle seat. As described herein and in the claims, the following numbers refer to the following structures as noted in the Figures.

5 refers to a system.
   10 refers to a vehicle seat.
   20 refers to a seat frame structure.
   21 refers to a first location (of the seat frame structure).
   22 refers to a second location (of the seat frame structure).
   30 refers to a seat headrest post.
   32 refers to a seat headrest.
   34 refers to a seat headrest post receiver.
   40 refers to an upholstery seam.
   50 refers to a seatback.
   55 refers to a seatback frame structure.
   65 refers to a seat base frame structure.
   100 refers to a storage panel.
   110 refers to a storage panel plane.
   120 refers to a storage panel top surface.
   130 refers to a storage panel bottom surface.
   140 refers to a storage panel mounting hole.
   150 refers to a top edge (of the storage panel).
   151 refers to a first distance (between the top bracket and the top edge of the storage panel).
   152 refers to a second distance (between the top bracket and the bottom edge of the storage panel).
   153 refers to a third distance (between the bottom bracket and the top edge of the storage panel).
   154 refers to a fourth distance (between the bottom bracket and the bottom edge of the storage panel).
   160 refers to a bottom edge (of the storage panel).
   170 refers to a first panel section.
   171 refers to a first channel.
   172 refers to a second channel.
   175 refers to a first panel section first side edge.
   176 refers to a first panel section second side edge.
   177 refers to a first panel section top edge.
   178 refers to a first panel section bottom edge.
   180 refers to a second panel section.

185 refers to a second panel section first side edge.
186 refers to a second panel section second side edge.
187 refers to a second panel section top edge.
188 refers to a second panel section bottom edge.
200 refers to a top bracket.
210 refers to a first lip.
212 refers to a top bracket through hole.
220 refers to a first fastener.
230 refers to a secondary lip.
232 refers to a secondary lip through hole.
240 refers to a clamp section.
242 refers to a clamp fastener.
244 refers to a clamp section aperture.
300 refers to a bottom bracket.
310 refers to a bottom bracket section.
312 refers to a bottom bracket through hole.
320 refers to a second fastener.
330 refers to a third fastener.

Figure 1:
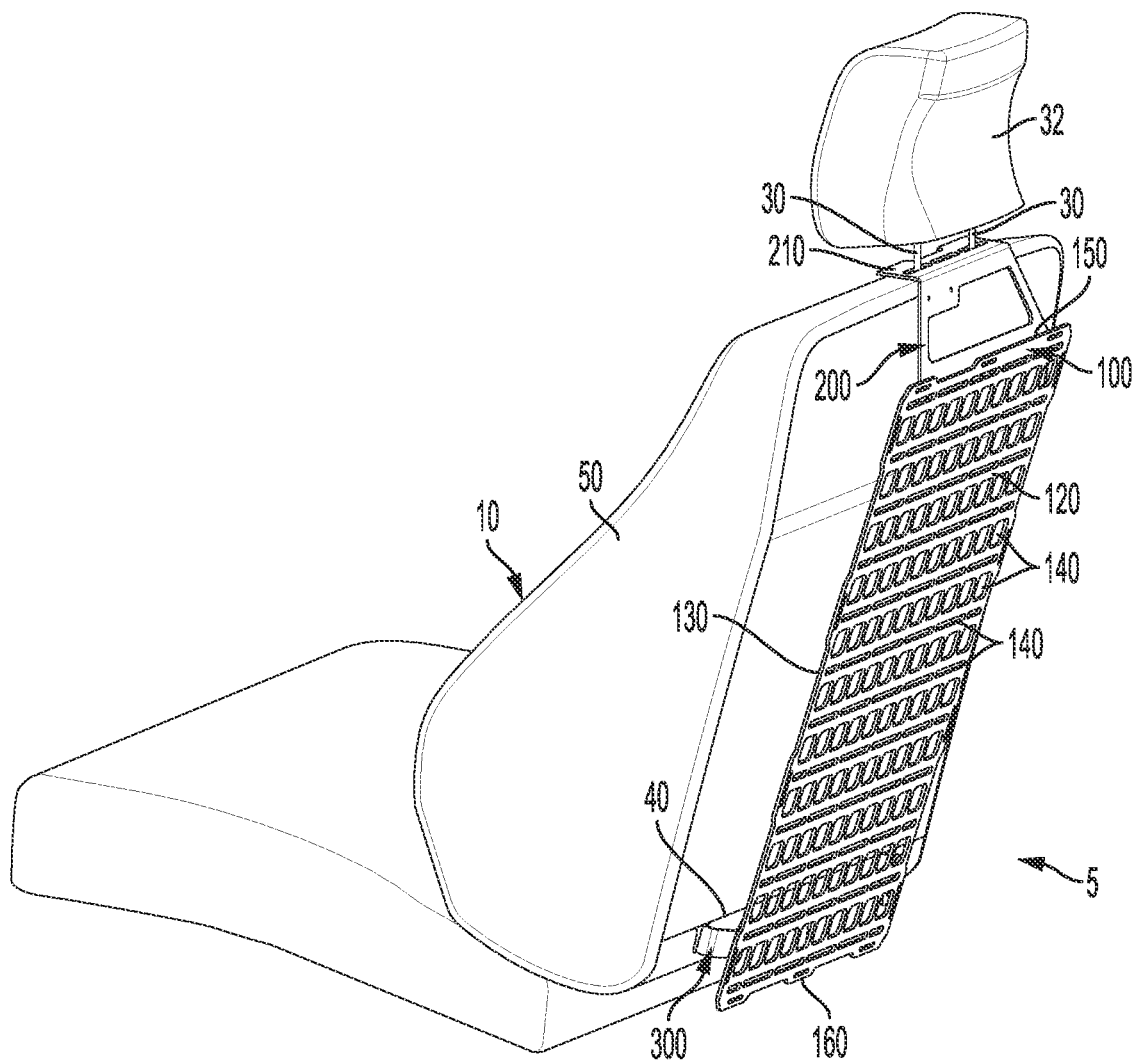
FIG. 1 is a perspective view of an embodiment of a system for attaching a storage panel to a vehicle seat.

FIG. 1 shows a perspective view of one embodiment of a system (5) for attaching a storage panel (100) to a vehicle seat (10). The system comprises the storage panel (100), at least one top bracket (200) and at least one bottom bracket (300).

Figure 7:
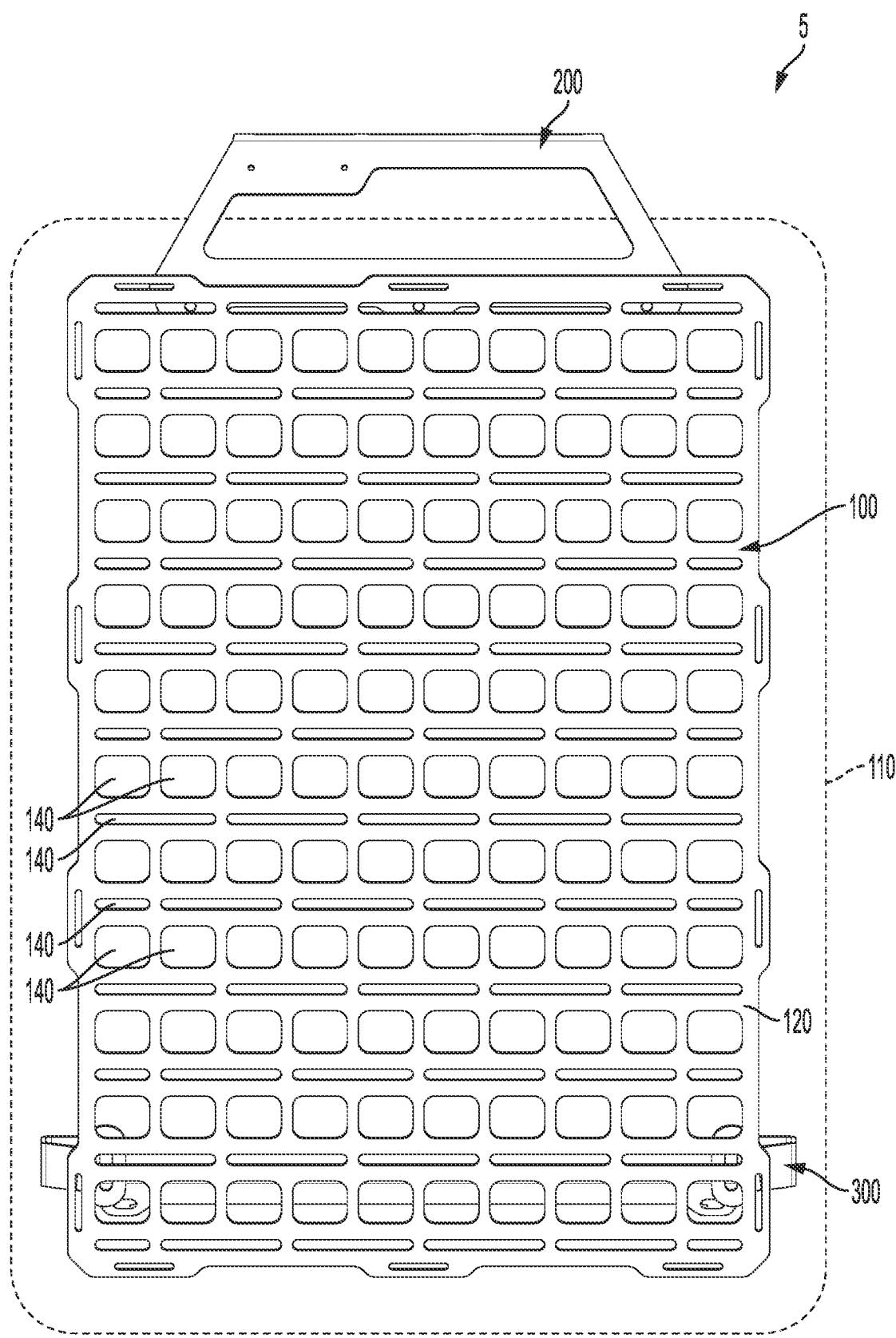
FIG. 7 is a front view of an embodiment of a system for attaching a storage panel to a vehicle seat.

As shown in FIG. 1, the storage panel (100) comprises a storage panel top surface (120) and a storage panel bottom surface (130) opposite the storage panel top surface. In some embodiments, the storage panel may be flat with the storage panel top surface lying in a storage panel plane (110) as shown in FIG. 7). Alternatively, the storage panel may be bent or curved such as if one wished for the storage panel to trace the curvature of a seat back of a vehicle. At least one storage panel mounting hole (140) passes from the storage panel top surface through the storage panel bottom surface. As such, the at least one storage panel mounting hole may be referred to as a through hole.

FIG. 1 also shows the at least one top bracket (200). As shown in FIG. 1, the at least one top bracket comprises a first lip (210) extending away from the storage panel bottom surface (130). While the Figures show the at least one top bracket extending from the storage panel bottom surface one of ordinary skill will recognize that the at least one top bracket may also be configured to extend from the storage panel top surface (120) and/or a top edge (150) of the storage panel. When installed on a vehicle seat (10) as shown in FIG. 1, the first lip will interact with the seat frame structure of the vehicle seat to at least partially attach the storage panel (100) to the vehicle seat as described herein.

Figure 2:
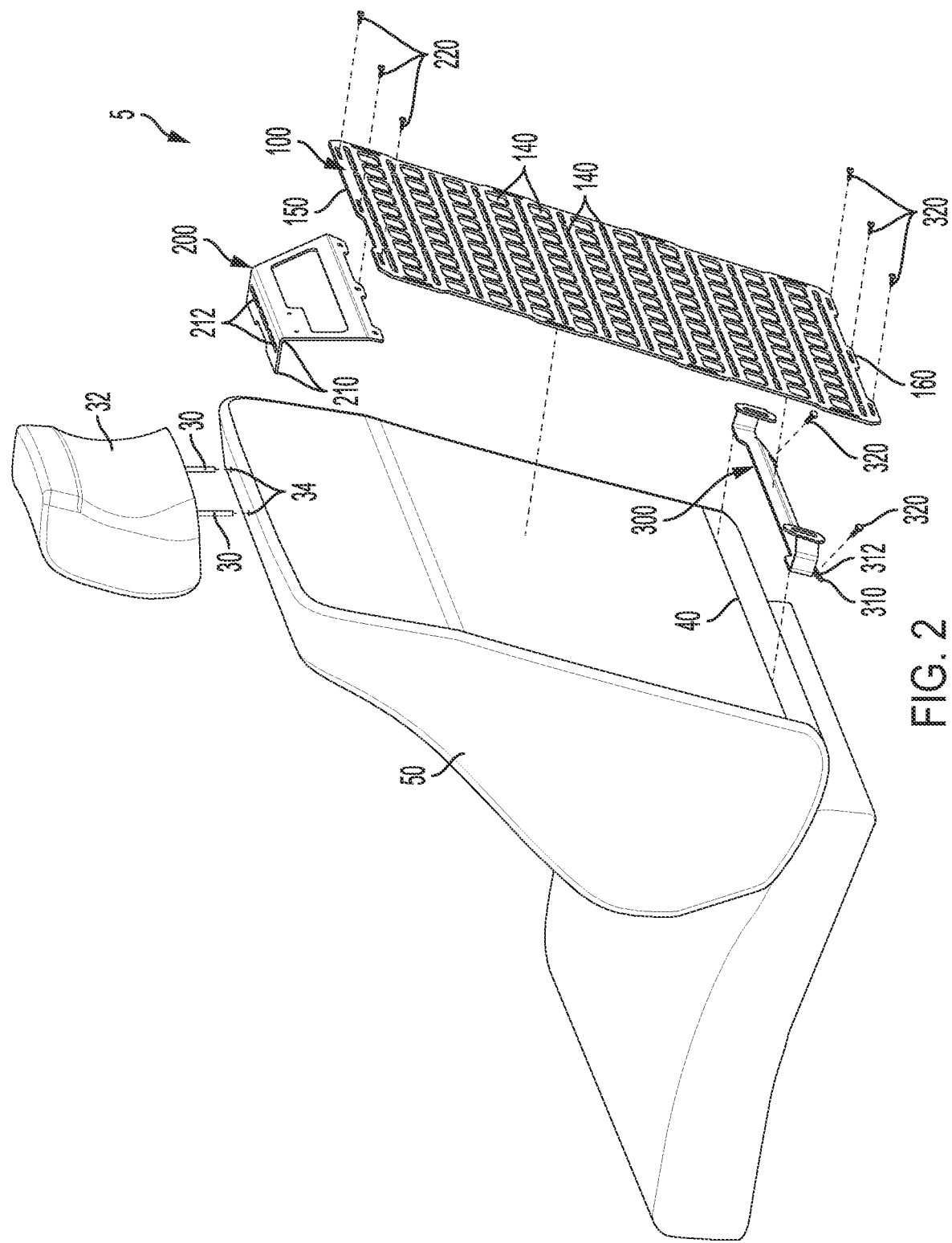
FIG. 2 is a partially exploded view of an embodiment of a system for attaching a storage panel to a vehicle seat.

Further shown in FIG. 1 is the at least one bottom bracket (300). The at least one bottom bracket comprises at least a first bottom bracket section (310 as shown in FIG. 2) extending from the storage panel bottom surface (130). While the Figures show the at least one bottom bracket extending from the storage panel bottom surface one of ordinary skill will recognize that the at least one bottom bracket may also be configured to extend from the storage panel top surface (120) and/or a bottom edge (160) of the storage panel. When installed on a vehicle seat (10) as shown in FIG. 1, the first bottom bracket will interact with the seat frame structure of the vehicle seat to at least partially attach the storage panel (100) to the vehicle seat as described herein. Preferably, the first bottom bracket is configured to pass through an upholstery seam (40) of the vehicle seat as shown in FIG. 1.

FIG. 2 shows a partially exploded view of the embodiment of a system (5) for attaching a storage panel (100) to a vehicle seat (10) of FIG. 1. In the embodiment shown in FIG. 2, the at least one top bracket (200) may be connected to the storage panel by a first fastener (220). Non-limiting examples of such a first fastener may include a bolt (with or without a nut), a screw, a rivet, a clip, a clamp, or the like. While FIG. 2 shows the at least one top bracket connected to the storage panel by a first fastener, other embodiments may exist in which the at least one top bracket may be integrally connected to the storage panel. Such integral connection may be achieved by manufacturing the storage panel and the at least one top bracket of a single integral piece of material (such as by injection molding or cutting and bending the storage panel and at least one top bracket from a single piece of material, often referred to as a billet) or by welding the at least one top bracket to the storage panel bottom surface (130), storage panel top surface (120), or top edge of the storage panel (150).

In some embodiments, the connection between the at least one top bracket (200) and the storage panel (100) may be a first hinged connection which allows the storage panel to pivot relative to the at least one top bracket. In such embodiments the at least one top bracket will include at least one first hinge oriented substantially perpendicular to a longitudinal axis of the storage panel. When present, the at least one first hinge may be located at an interface between the storage panel and the at least one top bracket, at an interface between the at least one top bracket and the first location of the seat frame structure (21), or along a portion of the body of the at least one top bracket.

Similarly, in the embodiment shown in FIG. 2, the at least one bottom bracket (300) may be connected to the storage panel (100) by a second fastener (320). Non-limiting examples of such a second fastener may include a bolt (with or without a nut), a screw, a rivet, a clip, a clamp, or the like. While FIG. 2 shows the at least one bottom bracket connected to the storage panel by a second fastener, other embodiments may exist in which the at least one bottom bracket may be integrally connected to the storage panel. Such integral connection may be achieved by manufacturing the storage panel and the at least one bottom bracket of a single integral piece of material (such as by injection molding or cutting and bending the storage panel and the at least one bottom bracket from a single piece of material, often referred to as a billet) or by welding the at least one bottom bracket to the storage panel bottom surface (130), storage panel top surface (120), or bottom edge of the storage panel (160).

In some embodiments, the connection between the at least one bottom bracket (300) and the storage panel (100) may be a second hinged connection which allows the storage panel to pivot relative to the at least one bottom bracket. In such embodiments the at least one bottom bracket will include at least one second hinge oriented substantially perpendicular to a longitudinal axis of the storage panel. When present, the at least one second hinge may be located at an interface between the storage panel and the at least one bottom bracket, at an interface between the at least one bottom bracket and the second location of the seat frame structure (22), or along a portion of the body of the at least one bottom bracket.

Figure 5:
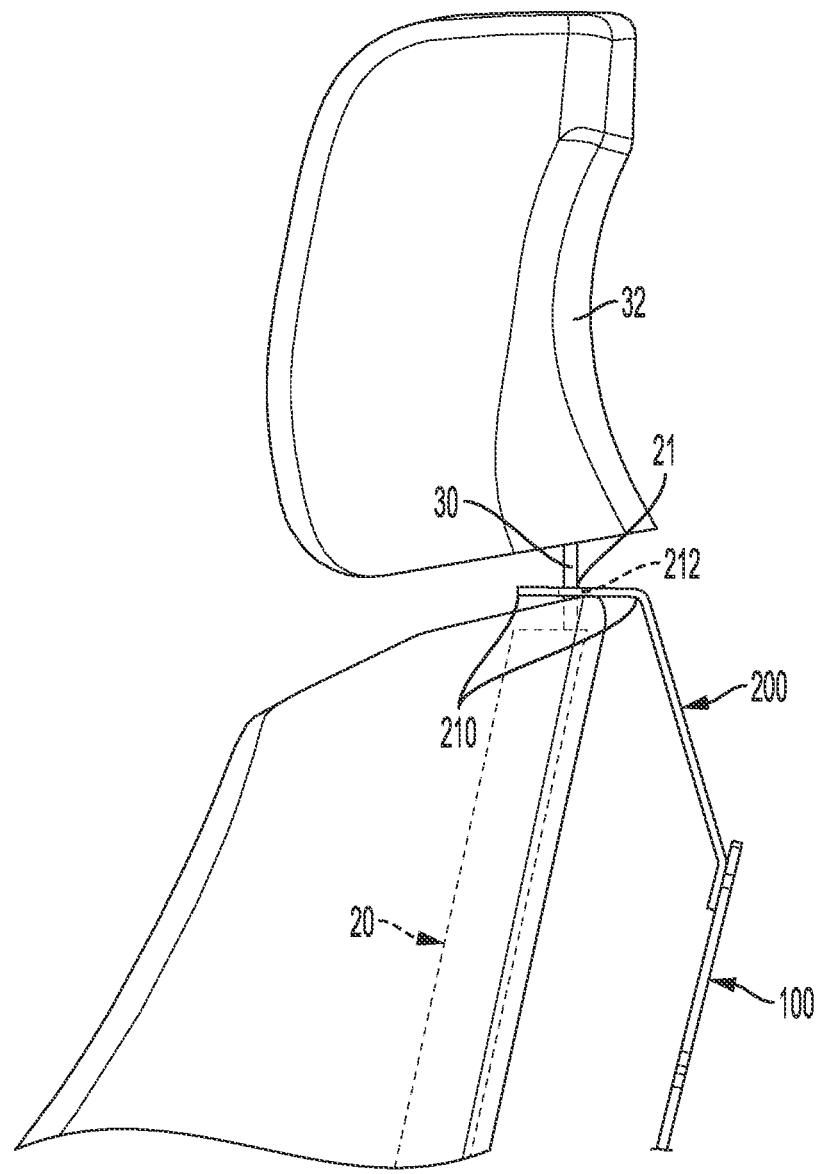
FIG. 5 is a close-up side view of one embodiment of a connection between a storage panel and a vehicle seat.

FIG. 2 further shows the at least one top bracket (200) comprising the first lip (210). As shown in FIG. 2, the first lip may comprise at least one top bracket through hole (212). It is this through hole which is configured to allow the at least one top bracket to connect to the seat frame structure (20 as shown in FIG. 5) at a first location (21 as shown in FIG. 5) of the seat frame structure. Referring back to FIG. 1 and also referring to FIG. 5, in some embodiments the first location of the seat frame structure may be a seat headrest post (30) which extends from the seat headrest (32) into a seat headrest post receiver (34) of the seatback (50).

Figure 3:
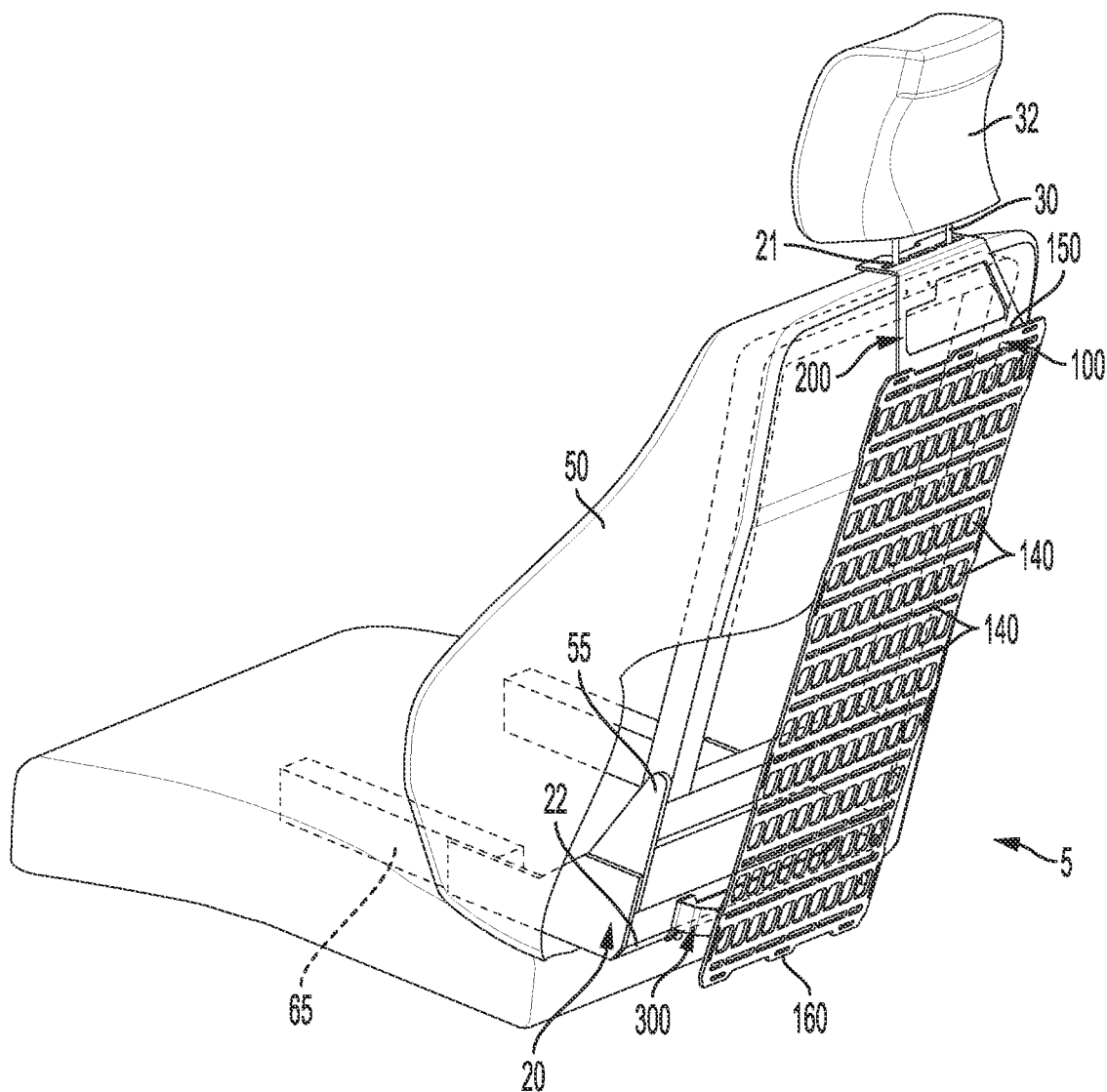
FIG. 3 is a perspective view of the embodiment of a system for attaching a storage panel a vehicle seat with a portion of the vehicle seat upholstery removed.
Figure 6:
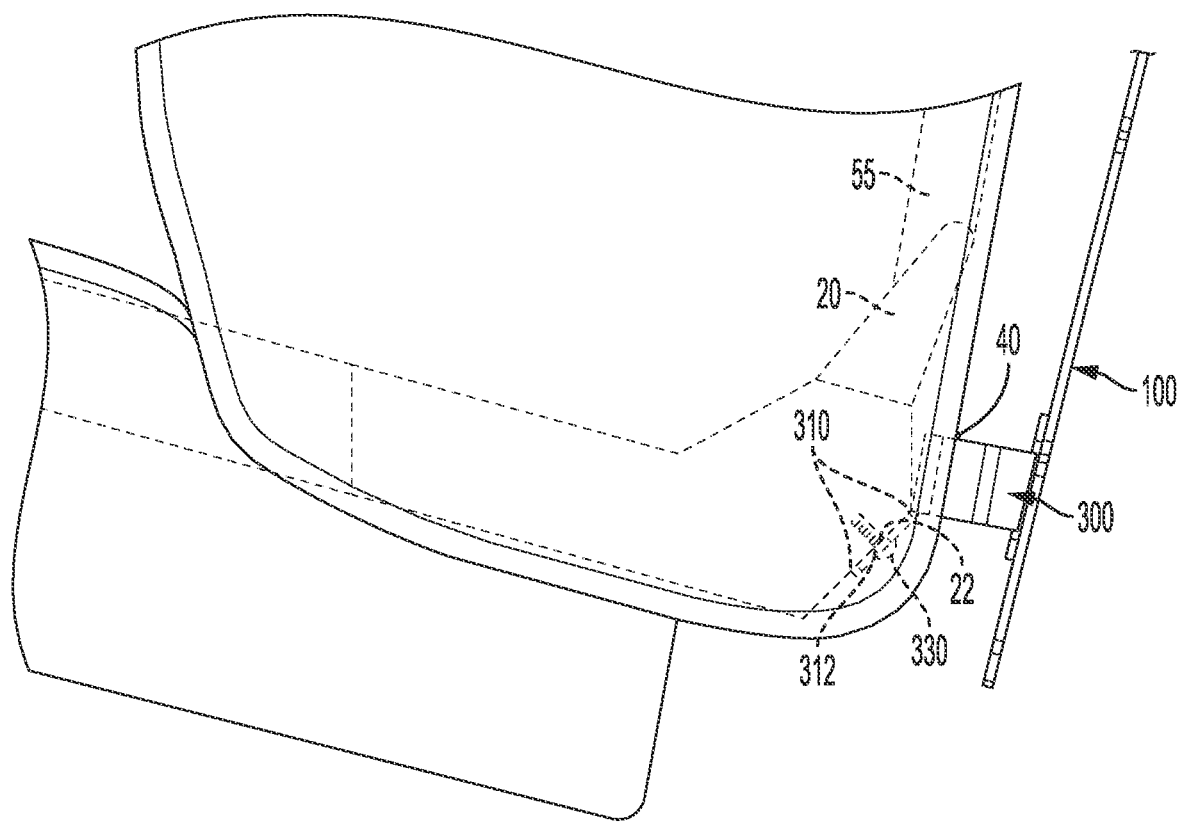
FIG. 6 is a close-up side view of another embodiment of a connection between a storage panel and a vehicle seat.

Also shown in FIG. 2 is the at least one bottom bracket (300) comprising the first bottom bracket section (310). As shown in FIG. 2, the first bottom bracket section may comprise at least one bottom bracket through hole (312). It is this through hole which is configured to allow the at least one bottom bracket to connect to the seat frame structure (20 as shown in FIG. 6) at a second location (22 as shown in FIG. 6) of the seat frame structure. Referring to FIG. 3 and FIG. 6, in some embodiments, the first bottom bracket section may be attached to the second location of the seat frame structure by a third fastener (330) such as a bolt, a screw, a rivet, a clip, a clamp, or the like.

Some embodiments may incorporate multiple top brackets. For example, in certain embodiments, the at least one top bracket may comprise at least a first top bracket and a second top bracket. When present, the first top bracket may comprise a first top bracket lip extending from a first point of the storage panel bottom surface (130), a first point of the storage panel top surface (120), or a first point along the top edge of the storage panel (150). The first point of the storage panel bottom surface or first point of the storage panel top surface will preferably be proximate to the top edge of the storage panel. The first top bracket lip may comprise a first top bracket through hole configured to attach to the first location of the seat frame structure. Similarly, the second top bracket may comprise a second top bracket lip extending from a second point of the storage panel bottom surface, a second point of the storage panel top surface, or a second point along the top edge of the storage panel. The second point of the storage panel bottom surface or second point of the storage panel top surface will preferably be proximate to the top edge of the storage panel. The second top bracket lip may comprise a second top bracket through hole configured to attach to a third location of the seat frame structure.

Certain embodiments may incorporate multiple bottom brackets. For example, in some embodiments, the at least one bottom bracket may comprise at least a first bottom bracket and a second bottom bracket. When present, the first bottom bracket may comprise a first bottom bracket section extending from a third point of the storage panel bottom surface (130), a third point of the storage panel top surface (120), or a first point along the bottom edge of the storage panel (160). The third point of the storage panel bottom surface or third point of the storage panel top surface will preferably be proximate to the bottom edge of the storage panel. The first bottom bracket section may comprise a first bottom bracket through hole configured to attach to the second location of the seat frame structure. Similarly, the second bottom bracket may comprise a second bottom bracket section extending from a fourth point of the storage panel bottom surface, a fourth point of the storage panel top surface, or a second point along the bottom edge of the storage panel. The fourth point of the storage panel bottom surface or fourth point of the storage panel top surface will preferably be proximate to the bottom edge of the storage panel. The second bottom bracket section may comprise a second bottom bracket through hole configured to attach to a fourth location of the seat frame structure.

FIG. 3 depicts an embodiment of the system (5) for attaching a storage panel (100) to a vehicle seat (10) with a portion of the upholstery removed from the vehicle seat such that the attachment of the at least one bottom bracket (300) to the seat frame structure (20) is visible. The seat frame structure may be of any shape, design, and material commonly used to construct a vehicle seat for a passenger vehicle.

Commonly, the seat frame structure (20) will include a seatback frame structure (55) and a seat base frame structure (65). Most commonly, the seatback frame structure will include a "U" shaped channel with one or more structures disposed between the opposing legs of the "U" shaped channel. Such structures may include one or more braces, one or more panels, and/or one or more springs.

As shown in FIG. 3, the first bottom bracket section (310) of the at least one bottom bracket (300) will comprise the at least one bottom bracket through hole (312 as shown in FIG. 2). This bottom bracket section is configured to attach to a second location (22) of the seat frame structure. Preferably, the second location of the seat frame structure will be a location on the seatback frame structure such as a receiving hole on the "U" shaped channel, a brace, and/or a panel. The bottom bracket section may be attached to the second location of the seat frame structure by a third fastener (330) such as a bolt, a screw, a rivet, a clip, a clamp, or the like.

While FIG. 3 shows the bottom bracket(s) (300) connected to the seatback frame structure (55) other embodiments may exist. For example, in some embodiments, the bottom bracket(s) may be configured to connect to the seat base frame structure (65). In other embodiments, the bottom bracket(s) may be configured to connect to the vehicle floor (not shown). Such embodiments may benefit from a hinged connection between one or both of the top bracket(s) and the storage panel, the bottom bracket(s) and the storage panel, and/or elongated fastening holes for connecting the bottom bracket(s) to the panel as described herein.

In any embodiment, it may be necessary to adjust the position of the bottom bracket(s) (300) relative to the seat panel (100). This may be achieved by utilizing a second fastener (320) to connect the bottom bracket(s) to the seat panel. In such embodiments, the second fastener (such as a bolt and nut) may pass through a fastening hole in the seat panel and a corresponding fastening hole in the bottom bracket(s). The fastening hole in the seat panel and/or the corresponding fastening hole in the bottom bracket(s) may be elongated in the direction of the panel longitudinal axis. One may then adjust the position of the bottom bracket(s) relative to the seat panel by loosening the fastener connecting the bottom bracket(s) to the seat panel and sliding the bottom bracket(s) up or down along the elongated fastening hole(s) relative to the panel longitudinal axis before retightening the fastener.

Figure 4:
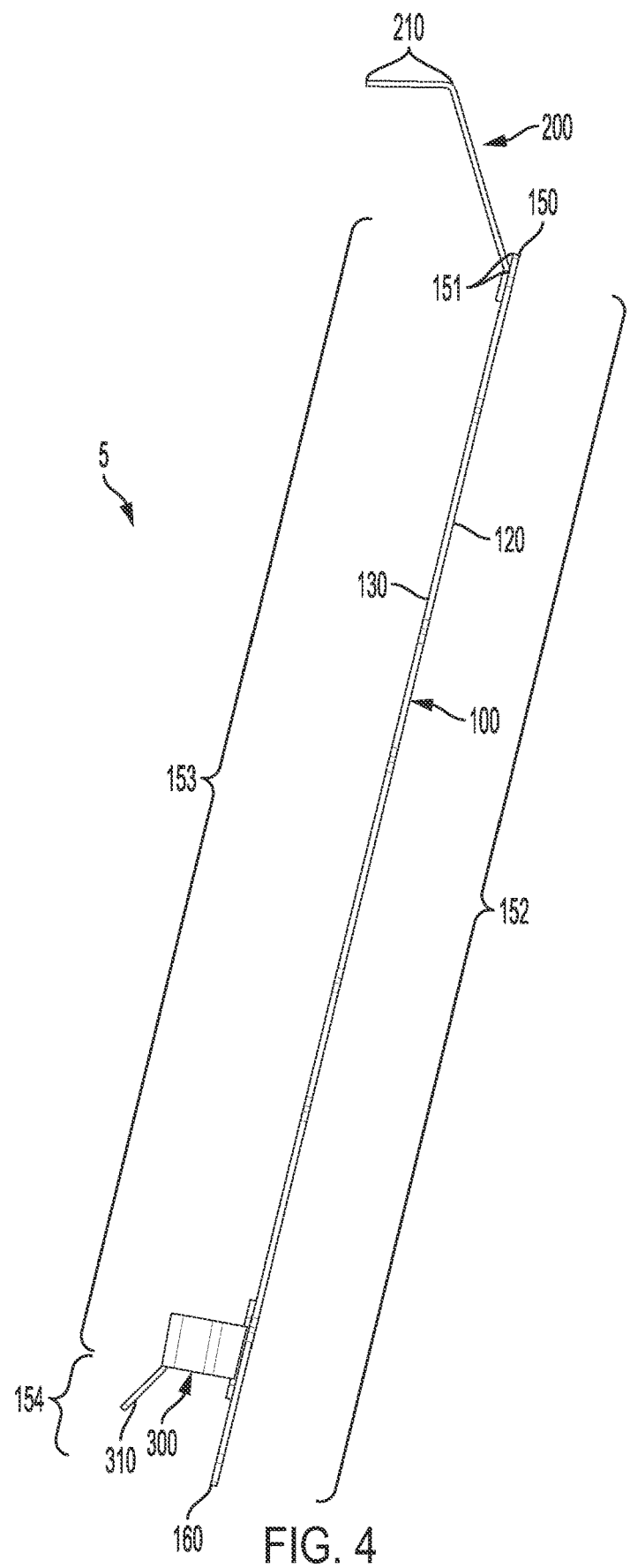
FIG. 4 is a side view of a system for attaching a storage panel to a vehicle seat.

FIG. 4 shows a side view of an embodiment of a system (5) for attaching a storage panel (100) to a vehicle seat. Specifically shown in FIG. 4 is an embodiment of the storage panel with a top bracket (200) and a bottom bracket (300) extending therefrom.

As shown in FIG. 4, the storage panel (100) comprises a top surface (120) and a bottom surface (130) opposite the top surface. The top bracket (200) extends away from the storage panel bottom surface or storage panel top surface proximate to a top edge (150) of the storage panel. In this context and as used in the claims, "proximate to" means that a first distance (151) between the top bracket and the top edge is less than a second distance (152) between the top bracket and the bottom edge (160).

Similarly, the bottom bracket (300) extends away from the storage panel bottom surface (130) or storage panel top surface (120) proximate to the bottom edge (160) of the storage panel as shown in FIG. 4. In this context and as used in the claims, "proximate to" means that a third distance (153) between the bottom bracket and the top edge is greater than a fourth distance (154) between the bottom bracket and the bottom edge.

FIG. 4 also shows the storage panel (100) spanning at least a distance between the at least one top bracket (200) and the at least one bottom bracket (300). That is to say that the storage panel may have a storage panel height with the storage panel height being equal to or greater than a distance between the at least one top bracket and the at least one bottom bracket.

FIG. 5 shows a close-up view of one embodiment of the at least one top bracket (200) attached to the seat frame structure (20). In the embodiment shown in FIG. 5, the at least one top bracket is attached to the seat frame structure by passing a seat headrest post (30) of the seat headrest (32) through a top bracket through hole (212) of the first lip (210). The seat headrest post then passes into the seat headrest post receiver (34 as shown in FIG. 2) with the seat headrest post acting as a fastener which attaches the storage panel (100) to the seat frame structure in a manner which reduces movement of the storage panel during vehicle operation. In this embodiment, the first location (21) of the seat frame structure to which the at least one top bracket is attached is the seat headrest post.

While FIG. 5 shows the first location (21) of the seat frame structure (20) to which the at least one top bracket (200) is attached being the seat headrest post (30), other embodiments may exist. For example, in some embodiments, the at least one top bracket may be attached to the cross-member, leg(s), braces, panels, and/or springs of the "U" shaped channel of the seat frame structure. In such embodiments, at least a portion of the at least one top bracket may pass through a hole or seam in the vehicle seat upholstery and be connected to the corresponding location of the seat frame structure by a fastener such as a bolt, a screw, a rivet, a clamp, a clip, or the like.

In embodiments comprising multiple top brackets as described herein (i.e.—a first top bracket and a second top bracket), the first top bracket may be attached to the seat frame structure by passing a first seat headrest post of the seat headrest through the first top bracket through hole of the first top bracket lip. The second top bracket may further be attached to the seat frame structure by passing a second seat headrest post of the seat headrest through the second top bracket through hole of the second top bracket lip. The first and second seat headrest posts may then pass into respective seat headrest post receivers with the seat headrest posts acting as the fasteners which attach the storage panel to the seat frame structure in a manner which reduces movement of the storage panel during vehicle operation. In such embodiments, the first location of the seat frame structure to which the first top bracket is attached is the first seat headrest post while the third location of the seat frame structure to which the second top bracket is attached is the second seat headrest post.

Alternatively, in some embodiments, one or both of the first top bracket and/or the second top bracket may be attached to a cross-member, leg, brace, panel, and/or spring of the "U" shaped channel of the seat frame structure. The location of the "U" shaped channel to which the first top bracket is attached may be considered the first location while the location of the "U" shaped channel to which the second top bracket is attached may be considered the third location. In such embodiments, at least a portion of the respective first top bracket and/or second top bracket may pass through a hole or seam in the vehicle seat upholstery and be connected to the corresponding location of the seat frame structure by a fastener such as a bolt, a screw, a rivet, a clamp, a clip, or the like.

FIG. 5 shows the at least one top bracket through hole (which may be one or both of the first top bracket through hole and/or the second top bracket through hole) having a circular profile. However, other shapes may be utilized including an oval, a triangle, a quadrilateral, a hexagon, or an octagon. That is to say that the at least one top bracket through hole (which may be one or both of the first top bracket through hole and/or the second top bracket through hole) may have a hole shape selected from the group consisting of circular, ovular, triangular, quadrilateral, hexagonal, or octagonal. The only limitation to the size and shape of the top bracket through hole(s) being that the top bracket through hole(s) should be of sufficient size and shape to allow the fastener—which may be a seat headrest post (30)—to pass through the top bracket through hole.

FIG. 6 depicts a close-up view of one embodiment of the at least one bottom bracket (300) attached to the seat frame structure (20). In the embodiment shown in FIG. 6, the at least one bottom bracket is attached to the seat frame structure by first passing at least a portion of the at least one bottom bracket through an upholstery seam (40). From there, a third fastener (330)—such as a bolt, a screw, a rivet, a clamp, a clip, or the like—may be passed through the bottom bracket through hole (312) of the first bottom bracket section (310) and into the second location (22) of the seat frame structure. The second location in the seat frame structure may be any location including a cross-member, leg(s), braces, panels, and/or springs of the "U" shaped channel of the seat frame structure. Preferably, the second location will be a location on the seatback frame structure (55).

In embodiments comprising multiple bottom brackets as described herein (i.e.—a first bottom bracket and a second bottom bracket), the first bottom bracket and/or the second bottom bracket may be attached to the seat frame structure by first passing at least a portion of the first bottom bracket and/or the second bottom bracket through an upholstery seam. From there, a fastener—such as a bolt, a screw, a rivet, a clamp, a clip, or the like—may be passed through the first bottom bracket through hole and/or the second bottom bracket through hole and into the second location or a fourth location of the seat frame structure. The second location and the fourth location in the seat frame structure may each individually be any location including a cross-member, leg(s), braces, panels, and/or springs of the "U" shaped channel of the seat frame structure. Preferably, the second location and the fourth location will each individually be a location on the seatback frame structure (55).

While FIG. 6 depicts the at least one bottom bracket (300) passing through an upholstery seam (40), other embodiments may exist. For example, in some embodiments, a portion of the seat frame structure (20)—preferably a portion of the seatback frame structure (55) may be exposed. That is to say that there may be no upholstery covering a portion of the seat frame structure. In such embodiments, it may be possible to attach the at least one bottom bracket (which may include a first bottom bracket and/or a second bottom bracket) directly to the seat frame structure by way of a fastener (i.e.—a bolt, a screw, a rivet, a clamp, a clip, or the like) without first passing any portion of said bottom bracket through in upholstery seam.

In other embodiments, there may be no upholstery seam or exposed portion of the seatback frame in the area proximate to the at least one bottom bracket (300). In such embodiments, a user may form a hole in the seat upholstery proximate to the at least one bottom bracket (which may include a first bottom bracket and/or a second bottom bracket). Said hole in the seat upholstery may then act similar to an upholstery seam through which the at least one bottom bracket (which may include a first bottom bracket and/or a second bottom bracket) passes before being attached to the second location of the vehicle seat frame structure by a fastener (i.e.—a bolt, a screw, a rivet, a clamp, a clip, or the like).

FIG. 6 shows the at least one bottom bracket through hole (which may be one or both of the first bottom bracket through hole and/or the second bottom bracket through hole) having a circular profile. However, other shapes may be utilized including an oval, a triangle, a quadrilateral, a hexagon, or an octagon. That is to say that the at least one bottom bracket through hole (which may be one or both of the first bottom bracket through hole and/or the second bottom bracket through hole) may have a hole shape selected from the group consisting of circular, ovular, triangular, quadrilateral, hexagonal, or octagonal. The only limitation to the size and shape of the bottom bracket through hole(s) being that the bottom bracket through hole(s) should be of sufficient size and shape to allow the third fastener (330) to pass through the bottom bracket through hole.

FIG. 7 shows a front view of one embodiment of the storage panel (100). As shown in FIG. 7, the storage panel comprises at least one storage mounting hole (140) passing from the storage panel top surface (120) through the storage panel bottom surface (130 as shown in FIG. 4). Preferably, the storage panel will comprise a plurality of storage mounting holes as shown in FIG. 7. In some embodiments, the plurality of storage mounting holes may be arranged in a MOLLE/PALS pattern. MOLLE—as used herein and in the claims—being an acronym for Modular Lightweight Load-carrying Equipment developed by the United States Army Soldier Systems Center (Natick) and used for load-bearing equipment and backpacks by several NATO armed forces. PALS—as used herein and in the claims—being an acronym for Pouch Attachment Ladder System—also developed by the United States Army Soldier Systems Center (Natick) and commonly used by NATO armed forces for attaching smaller equipment onto load-bearing platforms such as a MOLLE panel.

In some embodiments, one or more of the storage mounting hole(s) (140) may be a threaded hole. When used, the threaded hole(s) may be capable of receiving a threaded fastener—such as a bolt or a screw—for attaching an object to the storage panel (100).

While FIG. 7 shows the storage panel (100) having a substantially flat planar surface, other embodiments may exist. For example, in some embodiment the storage panel may comprise one or more horizontal bends. In other embodiments the storage panel may comprise one or more vertical bends. In still other embodiments the storage panel may comprise one or more diagonal bends. Embodiments are even envisioned in which the storage panel comprises more than one bend selected from the group consisting at least one horizontal bend, at least one vertical bend, and/or at least one diagonal bend.

Figure 8:
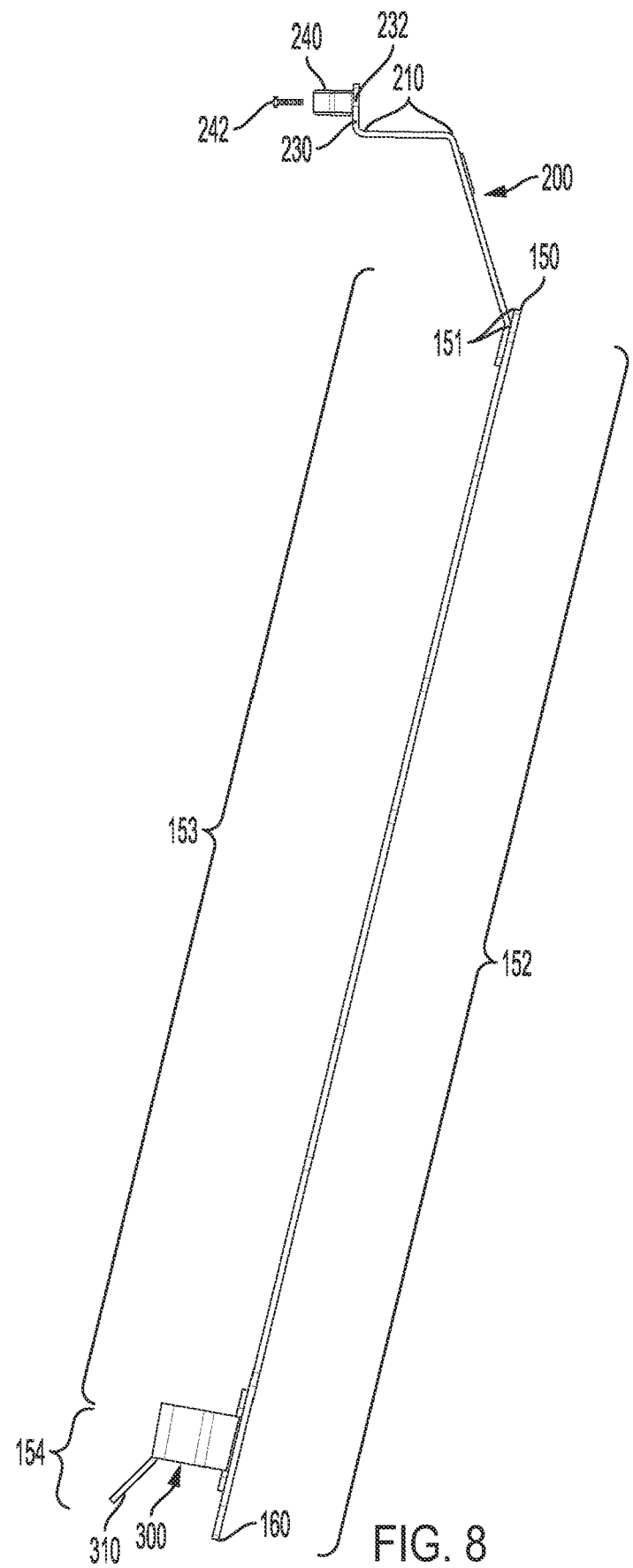
FIG. 8 is a side view of a system for attaching a storage panel to a vehicle seat.
Figure 10:
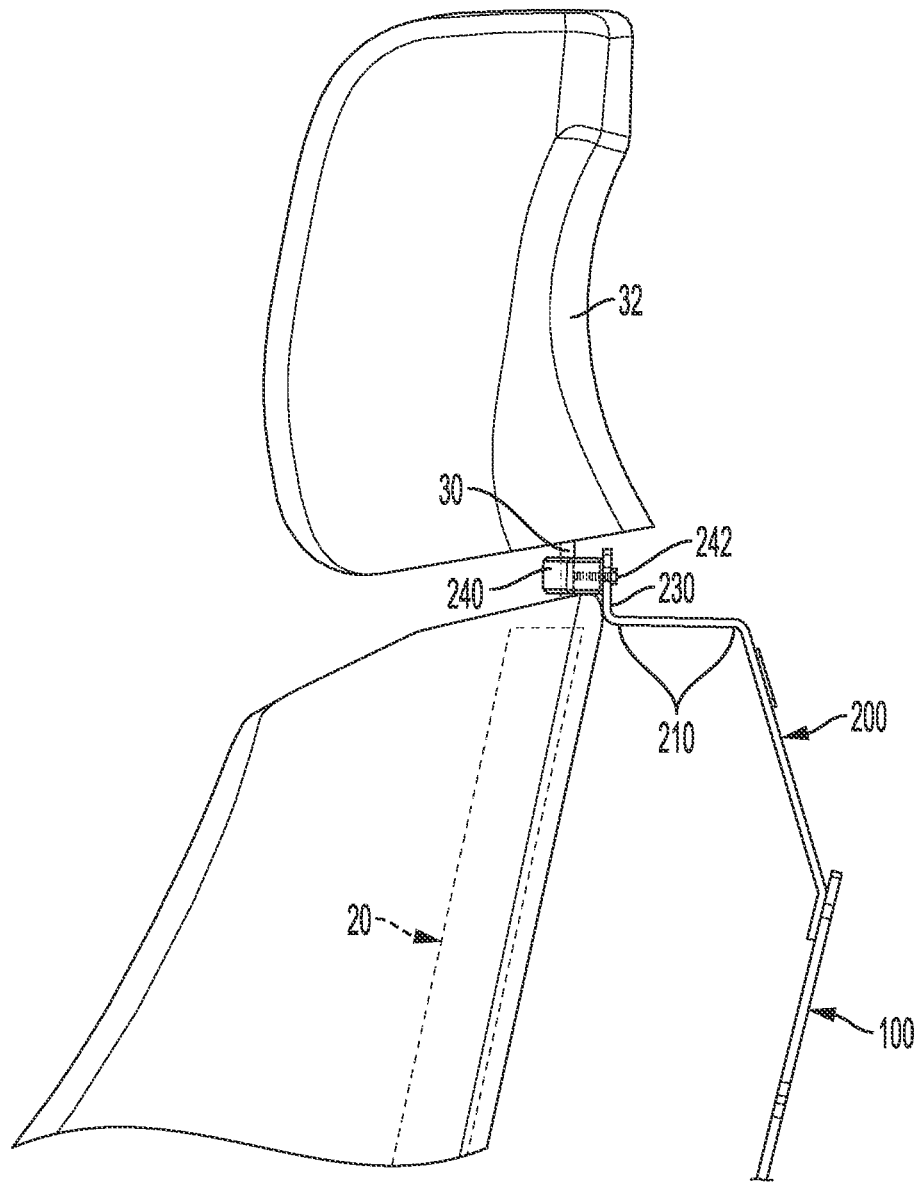
FIG. 10 is a close-up side view of an embodiment of a connection between a storage panel and a vehicle seat.

FIG. 8 shows an alternative embodiment—in side view—of a system (5) for attaching a storage panel (100) to a vehicle seat. In the embodiment shown in FIG. 8, the top bracket (200) comprises a secondary lip (230) extending upwardly from the first lip (210). While the Figures show the secondary lip extending upwardly from the first lip, one of ordinary skill will recognize that the secondary lip may also be configured to extend downwardly from the first lip. This secondary lip may comprise at least one secondary lip through hole (232 as shown in FIG. 10). While the secondary lip through hole may come in many shapes and sizes, a preferred shape is an extended rectangular or extended ovular shape sometimes referred to as a slot as shown in FIG. 10.

Figure 9:
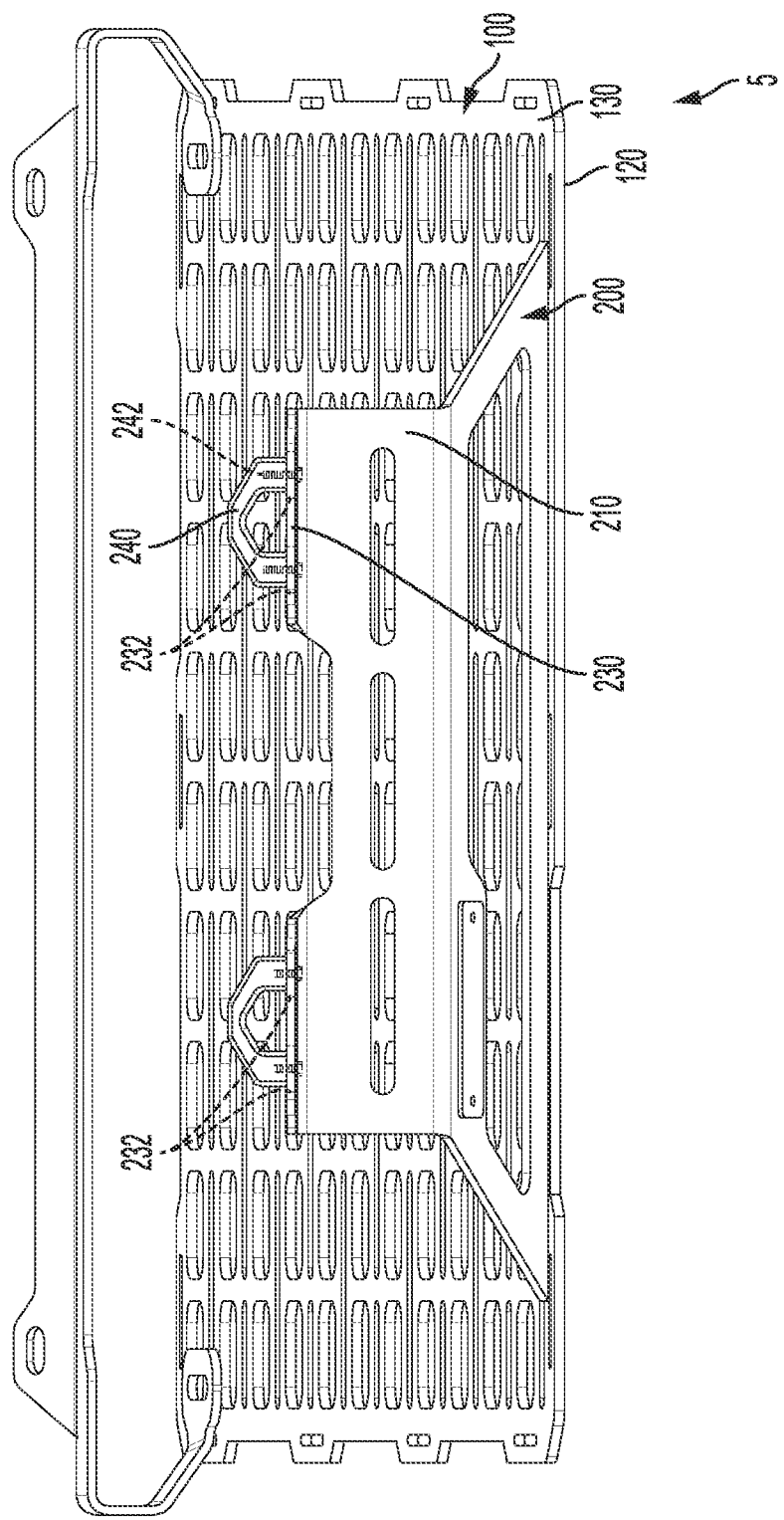
FIG. 9 is a top view of the system for attaching a storage panel to a vehicle seat of FIG. 8.

The embodiment shown in FIG. 8 also includes a clamp section (240). When present, the clamp section may be configured to attach to the secondary lip (230) by a clamp fastener (242 as shown in FIG. 9)—which may be a bolt, a screw, a rivet, or the like. As shown in FIG. 9—which is a top view of an embodiment of the system for attaching a storage panel to a vehicle seat similar to the embodiment shown in FIG. 8—the clamp fastener may attach the clamp section to the secondary lip by passing through the secondary lip through hole and into the clamp section as shown in the Figures.

FIG. 10 illustrates a close-up view of one embodiment of the at least one top bracket (200) attached to the seat frame structure (20). In the embodiment shown in FIG. 10, the at least one top bracket is attached to the seat frame structure by passing a seat headrest post (30) of the seat headrest (32) through a clamp section aperture (244 as shown in FIG. 9) in the clamp section (240) as shown in FIG. 10.

As the clamp section is removable by removing the clamp fastener this allows for easy installation and removal of the top bracket from the seat frame structure without having to remove the seat headrest post from the seat headrest post receiver (34). Also, as the secondary lip through hole is preferably an elongated rectangular or ovular hole (i.e.—a slot) the location of the clamp section can be varied along the length of the secondary lip through hole to allow for adaptation to vehicles having different distances between seat headrest posts.

In some embodiments, the clamp section aperture (244) may further comprise a sealing material—also sometimes referred to as a shim, a grommet, or an O-ring—disposed along at least a portion of an inner surface of the clamp section aperture. The sealing material may be made of any flexible material including rubber, plastic, or foam and may assist in providing a snug fit when a seat headrest post (30) is passed through the clamp section aperture.

One of ordinary skill will appreciate that—in embodiments comprising multiple top brackets, there may be multiple secondary lips. For example, when the top bracket comprises a first top bracket and a second top bracket, there may be a first secondary lip extending upwardly (or downwardly) from the first top bracket and a second secondary lip extending upwardly (or downwardly) from the second top bracket. The first secondary lip may comprise a first secondary lip through hole to which a first clamp section may be attached by at least one first clamp fastener. Similarly, the second secondary lip may comprise a second secondary lip through hole to which a second clamp section may be attached by at least one second clamp fastener.

Figure 11:
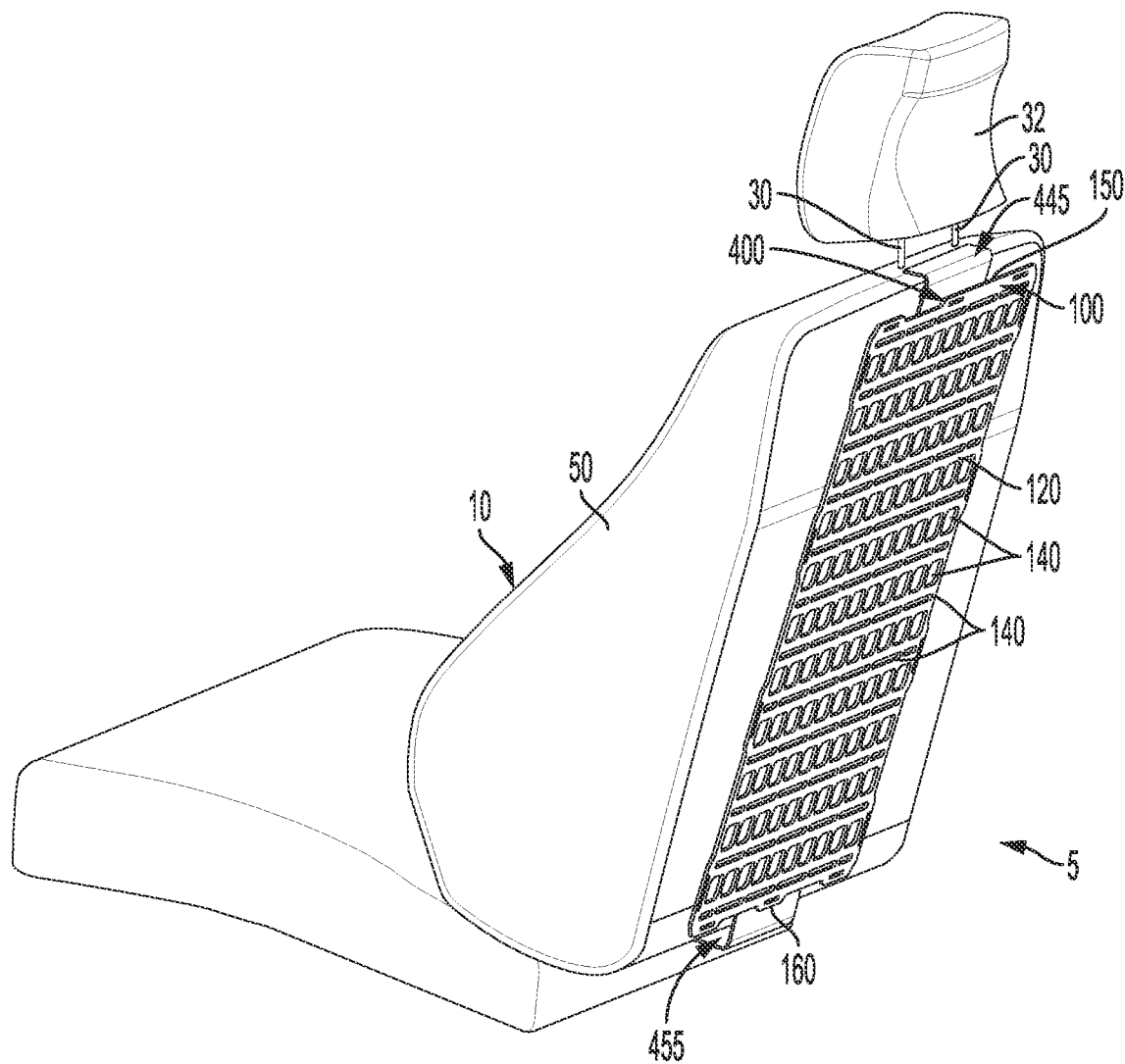
FIG. 11 is a perspective view of another embodiment of a connection between a storage panel and a vehicle seat.
Figure 12:
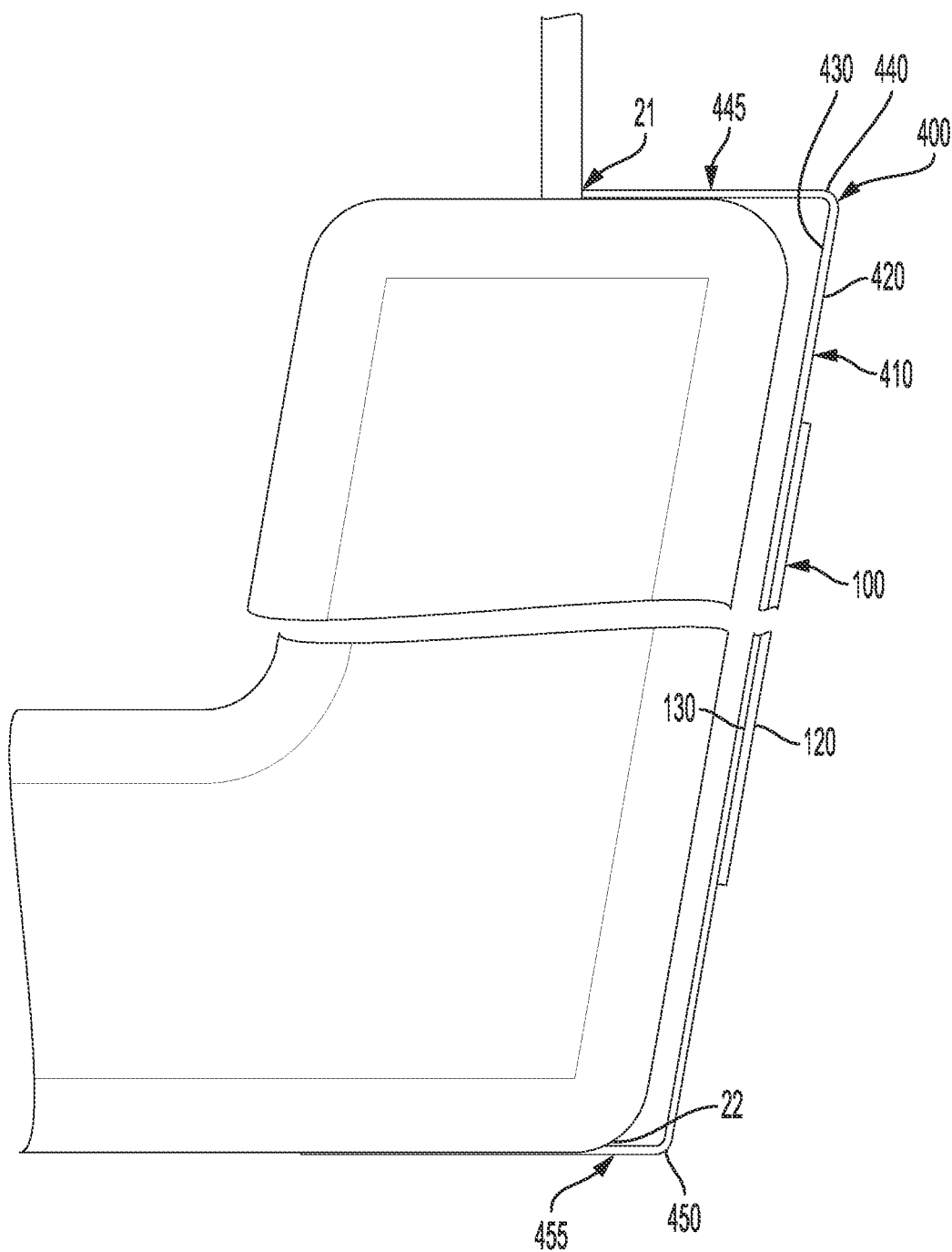
FIG. 12 is a side view of the embodiment of a connection between a storage panel and a vehicle seat of FIG. 11.

FIG. 11 and FIG. 12 show an alternative embodiment wherein the at least one top bracket and the at least one bottom bracket have been replaced by a single mounting bracket (400). As shown in FIG. 11 and FIG. 12, the mounting bracket may comprise a planar surface (410) having a mounting bracket top surface (420) and a mounting bracket bottom surface (430). A mounting bracket first lip (445) may extend away from the mounting bracket bottom surface at a mounting bracket top edge (440). Similarly, a mounting bracket second lip (455) may extend away from the mounting bracket bottom surface at a mounting bracket bottom edge (450).

Figure 13:
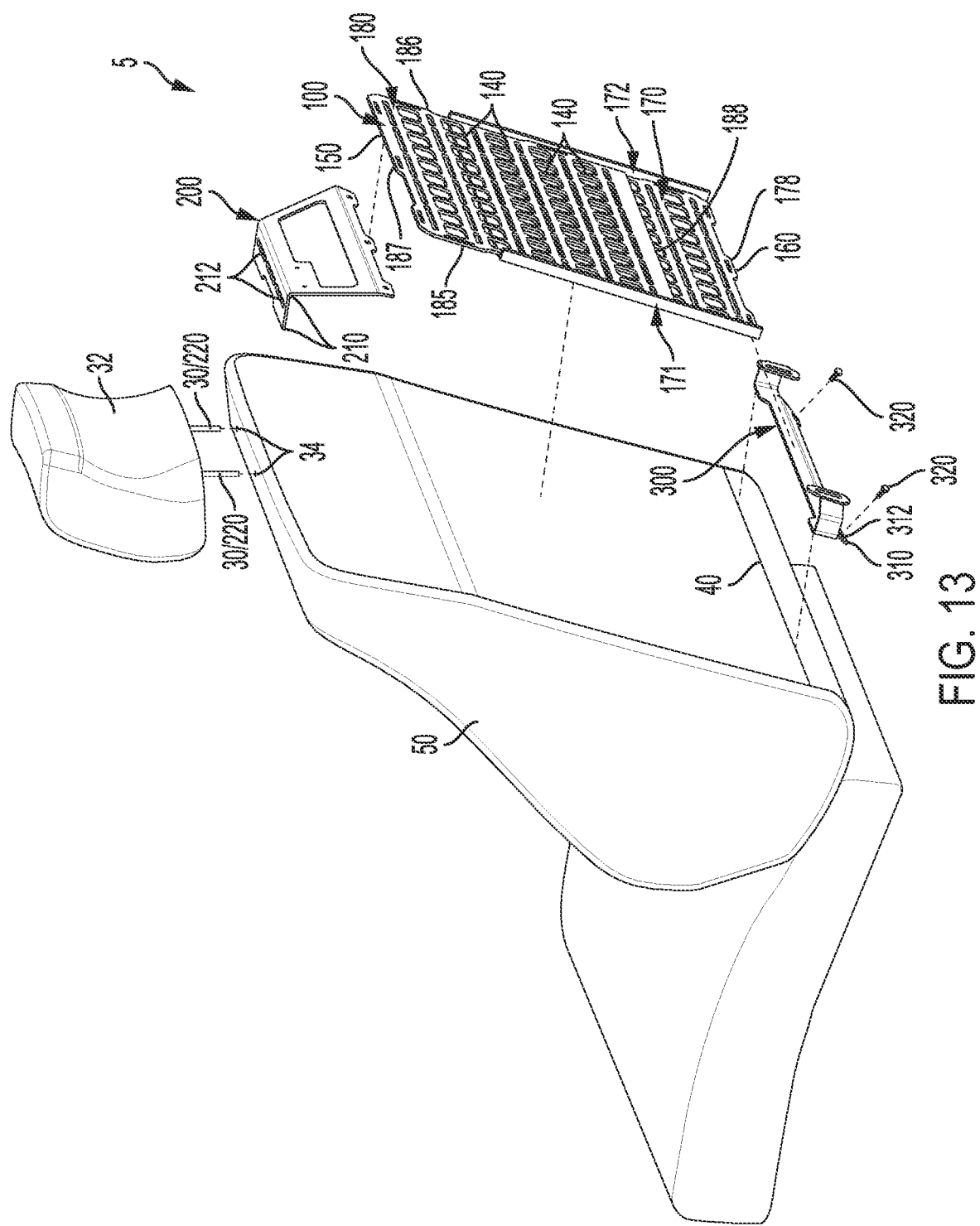
FIG. 13 is a perspective view of a telescoping panel.
Figure 14:
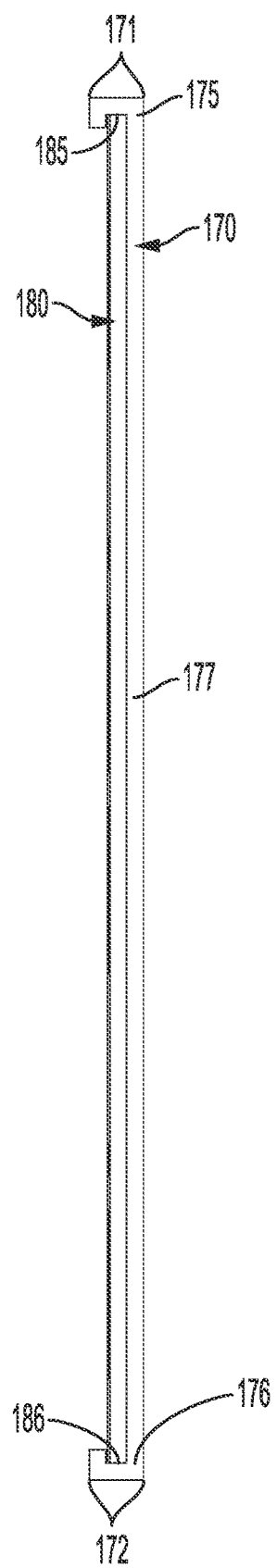
FIG. 14 is a top end view of a telescoping panel.

As shown in FIG. 11 and FIG. 12, the mounting bracket top surface (420) will connect to at least a portion of the storage panel bottom surface (130). The storage panel (100) may take any form and include any of the features disclosed herein—including a telescoping storage panel as shown in FIG. 13 and FIG. 14 and described herein. The connection between the mounting bracket top surface and the storage panel bottom surface may take many forms. In some embodiments, the connection may be by way of one or more fasteners such as bolts, screws, rivets, clamps, and the like. In other embodiments, the connection may be an integral connection wherein the mounting bracket may be welded to the storage panel bottom surface, or wherein the storage panel and the mounting bracket may be manufactured of a single integral piece of material such as by casting, injection molding, additive manufacturing, or the like.

Once assembled, the mounting bracket first lip (445) will be configured to attach to the first location (21) of the seat frame structure (20) while the mounting bracket second lip (455) will be configured to attach to the second location (22) of the seat frame structure. In this respect, the mounting bracket first lip takes the place of the at least one top bracket while the mounting bracket second lip takes the place of the at least one bottom bracket. One will therefore recognize that the mounting bracket first lip may be connected to the first location of the seat frame structure at any point and utilizing any of the structures disclosed herein relative to the at least one top mounting bracket. Similarly, one will recognize that the mounting bracket second lip may be connected to the second location of the seat frame structure at any point and utilizing any of the structures disclosed herein relative to the at least one bottom mounting bracket.

FIG. 13 and FIG. 14 show alternative embodiments of a storage panel (100) with the storage panel having an adjustable length dimension also known as a telescoping storage panel. As shown in FIG. 13, the telescoping storage panel may comprise a first panel section (170) and a second panel section (180) with the second panel section being slideably engaged with the first panel section.

FIG. 14 shows a top view of the telescoping storage panel. As shown in FIG. 14, the first panel section (170) comprises a first channel (171) connected to a first panel section first side edge (175). Similarly, the first panel section also comprises a second channel (172) connected to a first panel section second side edge (176). The connection between the first channel and the first panel section first side edge, and the connection between the second channel and the first panel section second side edge may take many forms. In some embodiments, the connection may be by way of one or more fasteners such as bolts, screws, rivets, clamps, and the like. In other embodiments, the connection may be an integral connection wherein the first channel and/or the second channel may be welded to the respective first panel section first side edge and/or first panel section second side edge; or wherein the first channel and/or the second channel along with the first panel section may be manufactured of a single integral piece of material such as by casting, injection molding, additive manufacturing, or the like.

Once assembled, the second panel section first side edge (185) may be disposed within the first channel (171) while the second panel section second side edge (186) may be disposed within the second channel (172). This configuration allows the second panel section (180) to slide vertically relative to the first panel section (170) such that the length of the storage panel (100) may be adjusted to fit vehicle seats of different sizes and configurations. The telescoping panel shown in FIG. 13 and FIG. 14 may also be useful in embodiments utilizing different bottom bracket mounting points such as mounting the bottom bracket (300) to the seat base frame structure (65) or to the floor of the vehicle. In some embodiments, the interface between the first channel and the second panel section first side edge and/or the interface between the second channel and the second panel section second side edge may include a locking mechanism such as a set screw or a pin passing through the respective channel and interfacing with the respective second panel side edge.

One will recognize that—in embodiments utilizing a telescoping panel—either panel section may be considered the "top" panel section or the "bottom" bracket section. That is to say that—in embodiments utilizing a telescoping panel—the at least one top bracket (200) may be connected to either a first panel section top edge (177) or a second panel section top edge (187). Similarly, the at least one bottom bracket (300) may be connected to either a first panel section bottom edge (178) or a second panel section bottom edge (188). It should be noted that the respective brackets will only be attached to one of the panel sections. That is to say that, when the at least one top bracket is connected to the first panel section top edge, the at least one bottom bracket will be connected to the second panel section bottom edge and vice versa.

While the embodiments shown in the Figures include a storage panel attached to a single "bucket" style seat, the invention is not so limited. One will recognize that the invention can be easily adapted to configure to all or a portion of a "bench" style seat, or to two or more "bucket" style seats by simply increasing the width of the storage panel and adding additional top bracket(s) and/or bottom bracket(s).

The system may also include a plurality of mounts and attachment devices (not shown) configured for attaching tools, equipment, and other devices to the storage panel. Non-limiting examples of such mounts and attachment devices include a quick first riser mount, quick first riser mount super clamp, quick first riser mount long arm, and/or a mole pouch—each of which is available from Builtright Industries LLC of Brookfield, Connecticut, U.S.A.

The system described herein is intended to be used without a flexible attachment strap which connects all or a portion of the storage panel to the vehicle seat. That is to say that—in preferred embodiments—the system does not contain a flexible attachment strap for connecting the storage panel to the vehicle seat. However, in certain embodiments an one or more flexible attachment strap(s) may be included which assist the at least one top bracket and the at least one bottom bracket in attaching the storage panel to the vehicle seat and/or reducing or preventing movement of the storage panel during operation when the flexible attachment strap is fastened snugly to both a portion of the storage panel and a portion of the vehicle seat.

The system described herein allows for the storage panel to be rigidly attached to a vehicle seat without permanently altering or damaging the vehicle seat. Additionally, the system disclosed herein eliminates any attachment mechanisms which extend to the front surfaces of the seat where they may cause injury or discomfort to a seat occupant or interfere with operation of the vehicle's airbags or seatbelts. Finally, by rigidly attaching the storage panel to the vehicle seat, storage panel shifting during vehicle operation is reduced or eliminated which minimizes or eliminates damage caused to the seat upholstery by such shifting and also reduces risk that objects attached to the storage panel may become dislodged in the event of an accident.

What is claimed is:

1. A system (5) for attaching a storage panel (100) to a vehicle seat (10), said system comprising:
    the storage panel comprising a storage panel plane (110) defining a storage panel top surface (120) and a storage panel bottom surface (130) opposite the storage panel top surface with at least one storage mounting hole (140) passing from the storage panel top surface through the storage panel bottom surface;
    at least one top bracket (200) comprising a first lip (210) said first lip comprising at least one top bracket through hole (212) configured to attach to a first location (21) of a seat frame structure (20); and
    at least one bottom bracket (300) comprising at least a first bottom bracket section (310) and at least one bottom bracket through hole (312) configured to attach to a second location (22) of the seat frame structure; and
wherein the storage panel spans at least a distance between the at least one top bracket and the at least one bottom bracket; and
wherein the at least one top bracket further comprises a secondary lip (230) extending upwardly from the first lip said secondary lip comprising at least one secondary lip through hole (232), the at least one top bracket further comprises a clamp section (240) configured to attach to the secondary lip by a clamp fastener (242) which passes through the secondary lip through hole and into the clamp section, and the first location of the seat frame structure is configured to attach to the clamp section at a clamp section aperture (244).

2. The system for attaching a storage panel to a vehicle seat of claim 1, wherein the storage panel comprises:
    a first panel section (170) comprising a first channel (171) connected to a first panel section first side edge (175), and a second channel (172) connected to a first panel section second side edge (176); and
    a second panel section (180) having a second panel section first side edge (185) and a second panel section second side edge (186); and
wherein the second panel section is slideably engaged with the first panel section with the second panel section first side edge disposed within the first channel, and the second panel section second side edge disposed within the second channel;
wherein the at least one top bracket is connected to one of a first panel section top edge (177) or a second panel section top edge (187); and
wherein the at least one bottom bracket is connected to one of a first panel section bottom edge (178) or a second panel section bottom edge (188).

3. The system for attaching a storage panel to a vehicle seat of claim 1, wherein the at least one top bracket is integrally connected to the storage panel.

4. The system for attaching a storage panel to a vehicle seat of claim 1, wherein the at least one top bracket is connected to the storage panel by a first fastener (220).

5. The system for attaching a storage panel to a vehicle seat of claim 1, wherein the at least one top bracket is hingedly connected to the storage panel.

6. The system for attaching a storage panel to a vehicle seat of claim 1, wherein the at least one top bracket comprises at least a first top bracket comprising a first top bracket lip said first top bracket lip comprising a first top bracket through hole configured to attach to the first location of the seat frame structure, and a second top bracket comprising a second top bracket lip said second top bracket lip comprising a second top bracket through hole configured to attach to a third location of the seat frame structure.

7. The system for attaching a storage panel to a vehicle seat of claim 1, wherein the at least one bottom bracket is integrally connected to the storage panel.

8. The system for attaching a storage panel to a vehicle seat of claim 1, wherein the at least one bottom bracket is connected to the storage panel by a second fastener.

9. The system for attaching a storage panel to a vehicle seat of claim 1, wherein the at least one bottom bracket is hingedly connected to the storage panel.

10. The system for attaching a storage panel to a vehicle seat of claim 1, wherein the at least one bottom bracket comprises at least a first bottom bracket comprising a first bottom bracket section said first bottom bracket section comprising a first bottom bracket through hole configured to attach to the second location of the seat frame structure, and a second bottom bracket comprising a second bottom bracket section said second bottom bracket section comprising a second bottom bracket through hole configured to attach to a fourth location of the seat frame structure.

11. The system for attaching a storage panel to a vehicle seat of claim 1, wherein the at least one storage mounting hole comprises a plurality of storage mounting holes arranged in a MOLLE/PALS pattern.

12. The system for attaching a storage panel to a vehicle seat of claim 1, wherein the at least one storage mounting hole comprises a plurality of storage mounting holes, and at least one of the plurality of storage mounting holes is a threaded hole capable of receiving a threaded fastener.

13. The system for attaching a storage panel to a vehicle seat of claim 6, wherein the third location of the seat frame structure is a second seat headrest post (30B).

14. The system for attaching a storage panel to a vehicle seat of claim 1, wherein the first location of the seat frame structure is a first seat headrest post (30A).

15. The system for attaching a storage panel to a vehicle seat of claim 10, wherein the fourth location of the seat frame structure is a first lower portion of a seatback frame structure (55).

16. The system for attaching a storage panel to a vehicle seat of claim 1, wherein the second location of the seat frame structure is a second lower portion of a seatback frame structure (55).

17. The system for attaching a storage panel to a vehicle seat of claim 1, wherein at least a portion of the bottom bracket is configured to pass through an upholstery seam (40) of the vehicle seat.

18. The system for attaching a storage panel to a vehicle seat of claim 1, wherein the system does not contain a flexible attachment strap for connecting the storage panel to the vehicle seat.

* * * * *